United States Patent [19]

Vinnemann et al.

[11] 3,882,461

[45] May 6, 1975

[54] SCANNING DEVICE

[75] Inventors: Antonius Vinnemann; Axel Johner, both of Stuttgart, Germany

[73] Assignee: Franz Morat GmbH, Stuttgart, Germany

[22] Filed: Sept. 27, 1973

[21] Appl. No.: 401,537

[30] Foreign Application Priority Data

Sept. 27, 1972 Germany ........................... 2247261

[52] U.S. Cl. ...................... 340/146.3 ED; 35/48 R; 340/146.1 R; 340/332; 340/378 R; 346/17; 235/61.11 E

[51] Int. Cl. ............................................ G09f 9/32

[58] Field of Search ........... 340/146.3 H, 146.3 AH, 340/146.3 AG, 378 R, 332, 146.1 R; 235/61.11 E; 35/35 A, 48 R, 48 A, 48 B; 346/17

[56] References Cited

UNITED STATES PATENTS

| | | | |
|---|---|---|---|
| 3,106,699 | 10/1963 | Kamentsky | 340/146.3 AG |
| 3,459,084 | 8/1969 | Schlafly | 35/48 R |
| 3,618,836 | 11/1971 | Bushnell et al. | 35/48 R |
| 3,665,164 | 5/1972 | Beveridge et al. | 235/61.11 E |
| 3,721,974 | 3/1973 | Jenifer et al. | 235/61.11 E |

*Primary Examiner*—Gareth D. Shaw
*Assistant Examiner*—Leo H. Boudreau

[57] ABSTRACT

A device for the line-by-line scanning of a drawing or pattern, the lines consisting of a plurality of dots, each having at least one of a plurality of different properties, by which signals are produced according to a selected property of the dots by a plurality of checking elements, one for each dot, and visually checking to verify the signals produced before feeding them to a programming memory.

19 Claims, 7 Drawing Figures

SCANNING DEVICE

This invention relates to the line-by-line scanning of a drawing.

Devices for the line-by-line scanning of drawings are known in many forms. In the simplest case they consist of a keyboard connected to a punching device for a punched tape. More expensive devices include a storage device into which, by means of a keyboard or by means of an automatically operated photoelectric scanning device, it is possible to store either, by the multiple scanning of a line, items of information which concern one chosen property alone, or all the information which can be obtained from the line by a single scanning of it (see German laid-open Pat. No. 2 119 291). With such devices the items of information are first collected and can then be transmitted further, in an additional stage of the process, to a peripheral apparatus, for example, a punch, a magnetic tape unit, a device for exposing film, or a calculator.

None of the display devices, as described above, permits direct checking of the items of information scanned. This leads to the disadvantage that erroneous items of information are often transferred to the peripheral apparatus and such errors are noticed for the first time when the peripheral apparatus or the information carrier prepared by it is employed for the automatic control of a machine or of a printing press by means of which the scanned drawing can be reproduced.

According to the invention there is also provided a device for the line-by-line scanning of a drawing the lines of which consist of points with one of a plurality of properties and for producing signals corresponding to the said properties, including a large number of checking elements, of which one is assigned to each point on the line to be scanned, and which makes it possible to check visually at least one property of the points after the scanning of the points.

Conveniently, the checking elements may be such as to be able to assume and to maintain at least two states, one of which states indicates the presence and the other the absence of a chosen property.

A device embodying the invention has the important advantage that, after the complete scanning of a line of the drawing, checking elements are assigned to every point on this line which, at the least, allow a visual check of all points to be made with respect to one chosen property. It is possible in this way to check whether the correct property has been assigned to each point after the scanning process has been completed.

Preferably, the checking elements consist of lamps which can be switched on or off. If, for instance, the chosen property is a colour and if, in a first scanning step, all points of a preselected colour have been scanned, then the apparatus may conveniently be designed so that, after the scanning step, all those lamps are lit which correspond to a point of the preselected colour.

The invention will now be described in more detail by way of example with reference to the accompanying drawings, in which.

Figure 1:
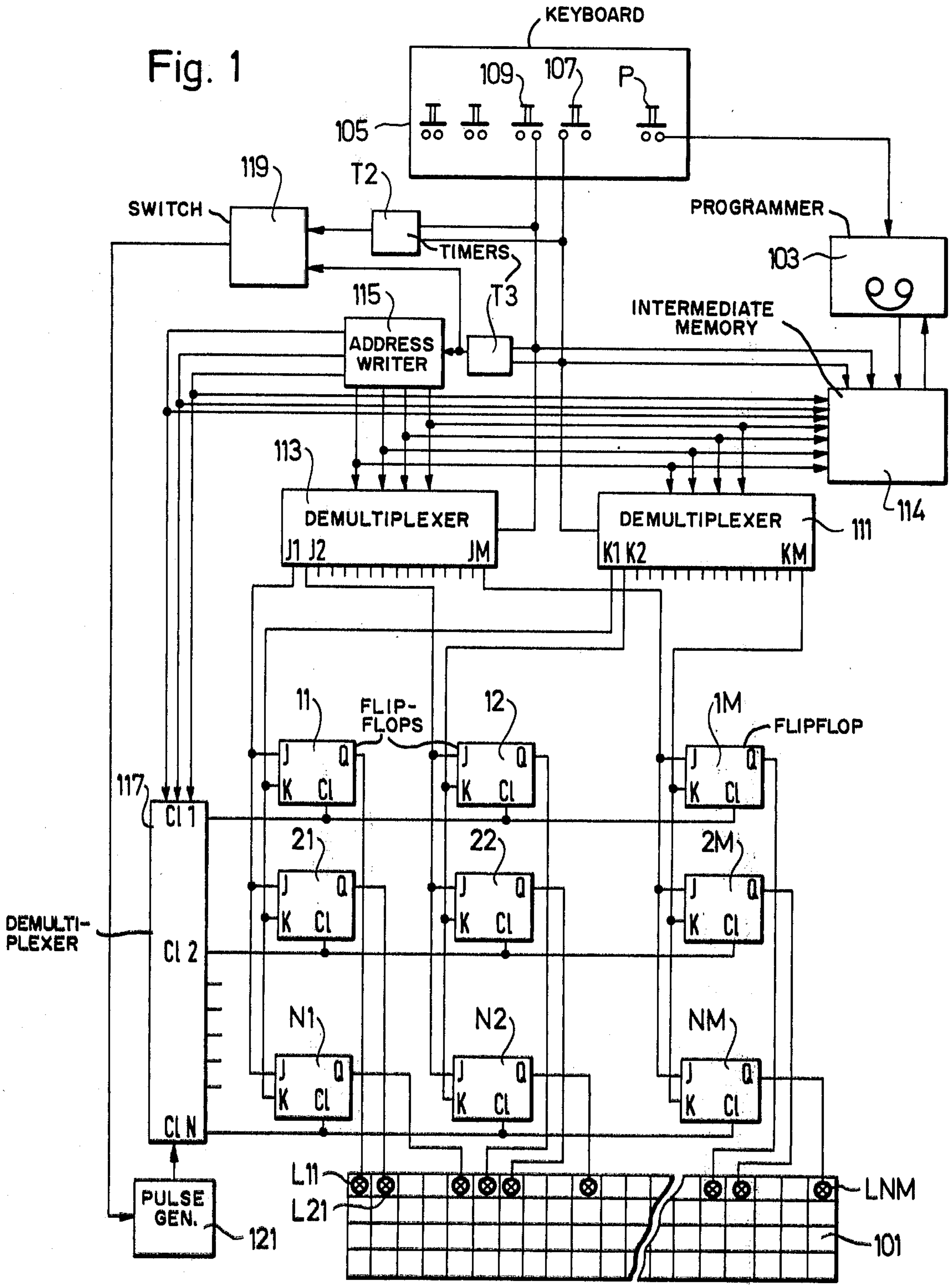
FIGS. 1 and 2 show schematically two embodiments of the invention with lamps as the checking elements.

FIG. 1 shows an embodiment of the invention for the scanning of a drawing 101 (point pattern), which consists of a large number of points arranged in shading lines and vertical columns, and which exhibit one of several possible properties, for example colours, values of brightness or shading. It is not important, in this case, whether the properties of the points are to be transmitted to a peripheral apparatus 103, which prints out the scanned drawing by means of a printer or reproduces it in the form of knitted or woven goods, or the items of information contained in the drawing are only to be permanently stored in some way so that punched tapes, control films, or suitable pattern wheels or discs for knitting purposes may be manufactured from them by means of the peripheral apparatus. Finally, it is also possible for the peripheral apparatus 103 to be the main storage unit of a data processing system.

A keyboard 105, with two keys 107 and 109, is provided for the input of the scanned items of information, in which the key 107 is pressed when the chosen property is present and the key 109 when the chosen property is absent. The apparatus is so designed that the two outputs of the keyboard connected to the keys 107 and 109 assume the state 1 when the keys are not pressed and assume the state 0 when the keys are operated.

A demultiplexer 111 is connected to the output of the key 107, and a demultiplexer 113 to the output of key 109. In addition, these outputs are connected to a random access memory (RAM) store 114, and also to an address-writer 115 through a time circuit T3. The address-writer 115 consists essentially of a counter whose outputs are connected to additional inputs of the demultiplexers 111 and 113. Three other outputs of the address-writer 115 are connected to a demultiplexer 117. The demultiplexers 111, 113 and 117 may, for example, be obtained from Texas Instruments Inc., Dallas, Tex., U.S.A., with the order numbers SN 74154 or SN 74155.

The signal produced by the keyboard 105 when one of the keys is operated is recorded, as well as in the RAM-store 114, in a storage device which consists of a large number of JK-flipflops 11 to NM, arranged in the form of a matrix of M vertical columns and N horizontal lines which satisfy the following truth table:

| $t_n$ | | $t_{n+1}$ |
|---|---|---|
| J | K | Q |
| 0 | 0 | $Q_n$ |
| 0 | 1 | 0 |
| 1 | 0 | 1 |
| 1 | 1 | $\overline{Q_n}$ |

The J-inputs of the flipflops 11, 21 . . . . . N1 are connected to the output J1 of the demultiplexer 113, the J-inputs of the flipflops 12, 22 . . . . . N2 to the output J2 and so on, with the J-input of the flipflops 1M, 2M . . . . . NM connected to the output JM of the demultiplexer 113. Similarly, the K-inputs of the flipflops of column 1 are connected to the output K1 of the demultiplexer 111, those of column 2 to the output K2, and, finally, those of column M to the output KM of the demultiplexer 111. Finally, the Cl-inputs of the flipflops 11, 12 . . . . . 1M are connected to the output Cl1 of the demultiplexer 117, the Cl-inputs of the flipflops 21, 22 . . . . . 2M to the output Cl2, and, finally, the Cl-input of the flipflops N1, N2 . . . . . NM to the output ClN of the demultiplexer 117. For example, we shall assume M = 16 and N = 8.

The Q-outputs of the flipflops 11 to NM are each connected to a correspondingly-numbered lamp L11 to LNM, which switches on when a 1 is present at the Q-output and, on the other hand, switches off when an 0 is present at the Q-output.

The outputs of the keyboard 105 which correspond to the keys 107 and 109 are, in addition, connected through a line circuit T2 to a release switch 119 of a clock pulse generator 121 which is connected to an additional input of the demultiplexer 117. Another key P of the keyboard 105 is connected to an on-switch of the peripheral apparatus 103, whose internally generated clock signals are transmitted to the RAM-store 114, when these are to be read out.

The method of operation of the device described is as follows. When the drawing 101 is scanned, the lamps, which are placed along a straight line at a distance from each other which corresponds to the distance between the points of the drawing, are arranged in such a way relative to the drawing that a lamp is assigned to each point on the line, beginning with L11. Finally, a clearing key on the keyboard 105 is operated in order to return all the flipflops 11 to NM into the initial position (0 on the output-Q) and to set the address-writer 115 to the first address, i.e. the flipflop 11. In this state, a 1 is applied to the outputs J1 and K1 of the demultiplexers 113 and 111, while the other outputs J2 to JM and K2 to KM are on 0. In addition, the clock signals of the clock pulse generator 121, which is started by the release switch 119, appear only at the output Cl1 of the demultiplexer 117. This has the result that a 1 is applied, respectively, to the inputs J and K of the flipflop 11, so that the signal at its output varies with the clock pulse frequency from 0 to 1, according to the above truth table, which produces a blinking of the lamp L11. The lamps assigned to the flipflops 21 to N1 remain dark since no clock signals are applied to their Cl-inputs, while, on the other hand, the flipflops 12 to N2, 13 to N3 etc. and 1M to NM are already fixed at dark because their J and K inputs are 0.

The blinking of the lamp L11 indicates that the first point on the line is to be scanned. If this point has the chosen colour or property, the key 107 is pressed so that an 0 appears at the output K1 of the demultiplexer 111 or at the K-input of the flipflop 11, which leads to a 1 appearing at the Q-output of flipflop 11 at the next clock signal. This 1 is permanently stored in this way, since the clock pulse generator 121 is blocked after the appearance of the clock signal which caused the 1 to appear because a blocking signal, derived from the pressing of the key and delayed by the time circuit T2 by exactly one period of the clock, is transmitted to the release switch 119. The lamp L11 is lit permanently.

After the 1 at the Q-output of flipflop 11 has been permanently stored, a signal is given by the time circuit T3 which, on the one hand, sets the address-writer 115 to the next address and, on the other hand, switches the clock pulse generator 121 on again. On the basis of the circuit described above, this means that the outputs J1 and K1 of the demultiplexers 113 and 111 remain as before on 1, while, on the other hand, the clock signal is now applied from the output Cl2 of the demultiplexer 117, so that the lamp L21 blinks, indicating that the second point on the line can now be scanned. If this point does not possess the chosen property, the key 109 is pressed so that the J-input of the flipflop 21 is set to 0. It follows from the truth table above that an 0 must appear at the Q-output of the flipflop 21. This corresponds to a permanent switching-off of the lamp L21, while, in accordance with the description above, the clock pulse generator 121 is immediately switched off, and, as a result, the item of information at the Q-output of the flipflop 21 cannot be altered even by releasing the key 109. In addition, the clock signal now appears at the output Cl3 of the demultiplexer 117 so that the lamp L31 blinks. The same process is repeated until the items of information corresponding to the properties of the first N1 points of the second line have been stored in all the flipflops 11 up to N1.

In the next section of the process the clock signals again appear at the output Cl1 of the demultiplexer 117. Meanwhile, however, the outputs J2 and K2 of the demultiplexers 113 and 111 are prepared by means of the address-writer 115 in such a way that only the lamp L12 is blinking and the flipflop 12 is ready to accept an item of information. This process continues until all points on the line have been scanned.

After the scanning of the line all those lamps must be lit which correspond to points with the chosen property, and this can easily be checked visually. If a lamp is lit in error or not lit at all, a correction can be made since the blinking light can be moved back to the point concerned by means of an additional key on the keyboard and by means of a constructional element which is not illustrated and the corresponding key can then be pressed.

The items of information provided by pressing the keys 107 and 109 are also transferred to the RAM-store 114 by the scanning process. By this means it is ensured that after the line has been scanned it is possible to switch on the peripheral apparatus 103 by pressing the key P which calls up the necessary signal, with its internal clock, from the RAM-store 123. Finally, all the flipflops 11 up to NM are reset to the initial position and the points on the next line are scanned.

Figure 2:
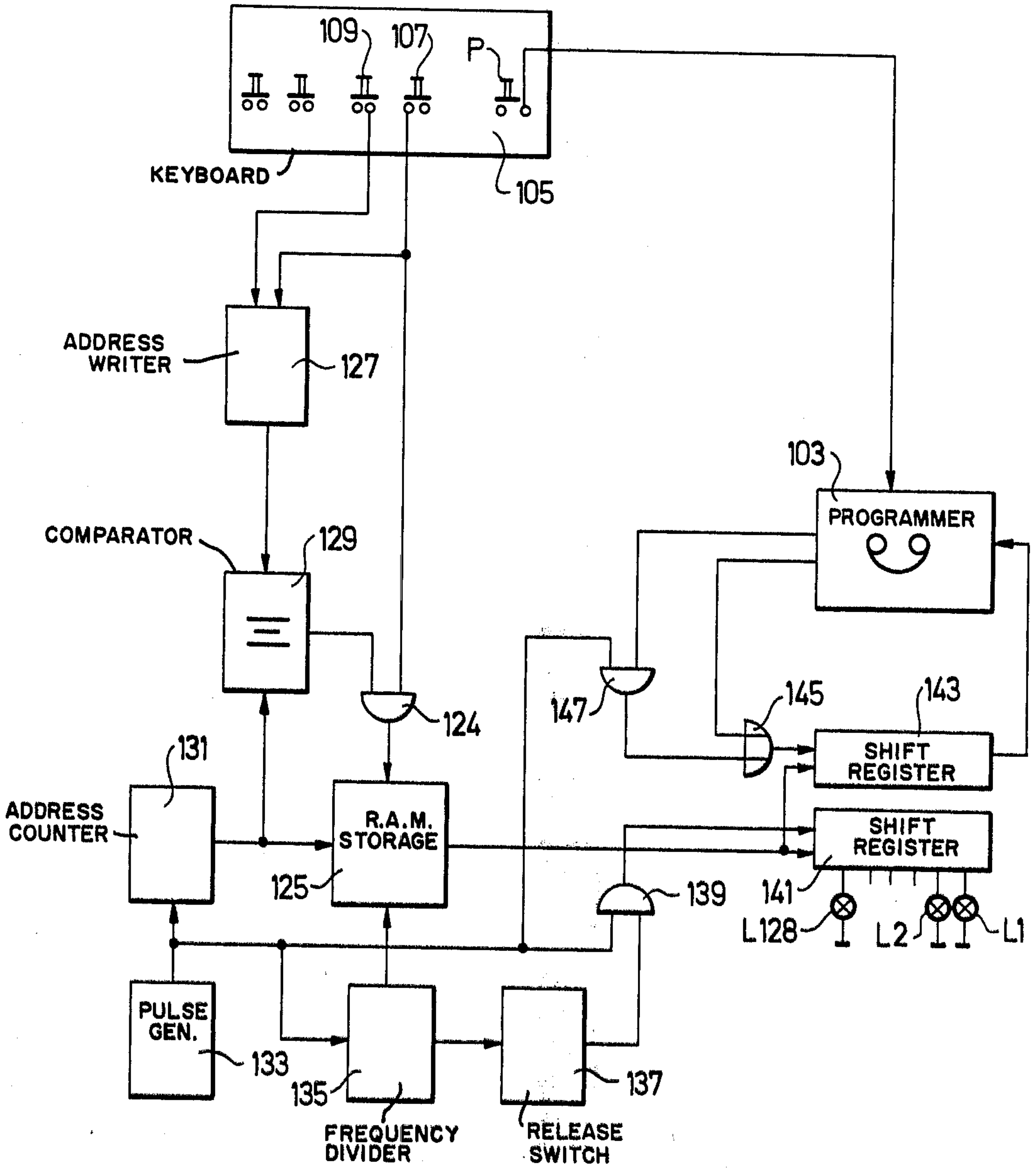

The embodiment of FIG. 2 is also based on the principle of allowing the lamp which corresponds to the next point to be scanned to blink and, in addition, of switching on permanently all those lamps which correspond to points possessing the chosen property.

According to FIG. 2, the 1 signals produced by the key 107 are transmitted through an AND-member 124 to a RAM-store 125 and are stored there at the address which is preselected by an address-writer 127, which includes a counter to which the 1 signals produced by pressing one of the keys 107 or 109 are applied. The coded signal outputted by the address-writer 127 is transmitted to a comparator 129 which compares this signal with a signal, also coded, produced by an address counter 131 which alters continuously on account of the clock signal transmitted to the address counter 131 by a clock pulse generator 133. In the case of agreement the comparator 129 gives a signal which is transmitted to the other input of the AND-member 124.

The output of a frequency divider 135 connected to the clock pulse generator 133 is applied, on the one hand, to a further input of the RAM-store 125 and, on the other, to a release switch 137 whose output is in turn connected to an AND-member 139, the other input of which is connected to the clock pulse generator 133. The output of this AND-member 139 is connected to the clock input of a shift register 141 the information input of which is connected to the output of the RAM-store 125. The information input of a second shift register 143 is also connected to the output of the RAM-store 125, the clock input of the second shift register 143 being connected, through an OR-member 145, on one hand to the internal clock generator of the peripheral apparatus 103 and, on the other to an AND-member 147 one input of which is connected to the clock pulse generator 133 while its other input is connected to an output of the apparatus 103. The storage elements of the shift register 141 are connected, respectively, to lamps L1 . . . . . L128, in such a way that these lamps are only lit when the corresponding storage element is occupied by a 1. The output of the shift register 143 is connected to the information input of the peripheral apparatus 103.

The method of operation of this device is as follows. After the lamps L1 to L128 have been arranged along the line to be scanned and a clearing key has been pressed, the output of the key 107 is at 0, so that no 1 items of information can be recorded in the RAM-store even when the comparator 129 establishes an agreement with the address 1 given by the address-writer 127.

In the meantime, however, pulses are generated by the frequency divider 135, with a frequency which is markedly lower than the clock frequency of the clock pulse generator 133, and these pulses act through the release switch 137 to produce exactly the same number of clock pulses at the clock input of the shift register 141 as the number of storage elements contained within the register. This has the result that all the storage positions of the RAM-store 125 are questioned in turn exactly once and the items of information read off are recorded serially in the shift register 141, so that the item of information corresponding to the address 1 arrives at the storage element corresponding to the lamp L1.

Simultaneously, those items of information within the RAM-store 125 which belong to the address 1 are altered by a pulse from the frequency divider in such a way that on the first recording of the RAM-items of information in the storage element corresponding to the lamp L1 an 0 is produced, on the second recording a 1 is produced and then afterwards an 0 and a 1 are produced alternately. This alternation of the items of information is, for example, brought about, in agreement with the example of embodiment according to FIG. 1, in that the RAM-store 125 is constructed from JK-flipflops, on whose outputs 0 and 1 are applied alternately by a pulse from the frequency divider.

If the first point in the line does not possess the chosen property, then the key 109 is pressed whereby only the address-writer 127 is set to the address 2 so that the item of information corresponding to the address 2 now alternates with the frequency of the frequency divider. On the other hand, if the first point exhibits the chosen property the key 107 is operated, so that when the next agreement is established by the comparator a 1 is stored in the storage position of the RAM-store which corresponds to the address 1 and, after a suitable delay, the address-writer is set to the address 2. This has the result that the item of information in the storage position corresponding to the address 2 now changes continuously and that, at each recording process in the shift register 141 brought about by the release switch 137, a 1 appears at the storage element which corresponds to the lamp L1 and is maintained until the next recording process, so that the lamp L1 is lit.

After all the points have been fed into the RAM-store, a check is possible, as in the example of embodiment according to FIG. 1, in the sense that it is possible to see whether the correct property has been assigned to each point. In contrast to the embodiment of FIG. 1, the lamps L1 to L128 are not, however, lit permanently in those cases where the chosen property is present; but they are only lit periodically during intervals of time which are shorter than the half period of the frequency divider, since during part of the other half period a new recording process always occurs. With a suitable adjustment of the relation between the frequency of the clock pulse generator and that of the frequency divider it is, however, possible to arrange that, with respect to checking and with respect to blinking, the result for each lamp is the same as in the embodiment of FIG. 1.

After checking, a signal is first generated by means of the apparatus 103 by pressing the key P, which prepares the AND-member 147 for exactly as many cycles of the clock pulse as the number of storage elements in the shift register. In this way the items of information stored in the RAM-store 125 are written into the shift register 143 with the frequency of the clock pulse generator 133. Finally, the internal clock generator of the apparatus 103 is then switched on and transmits the information items collected in the shift register 143 further to the apparatus 103. The use of the second shift register 143 has the advantage, in this process, that during scanning it is possible to begin the next line before all the items of information of the first line have been applied to the peripheral apparatus 103. A similar second storage device could also be provided in the example of embodiment according to FIG. 1.

Figure 3:
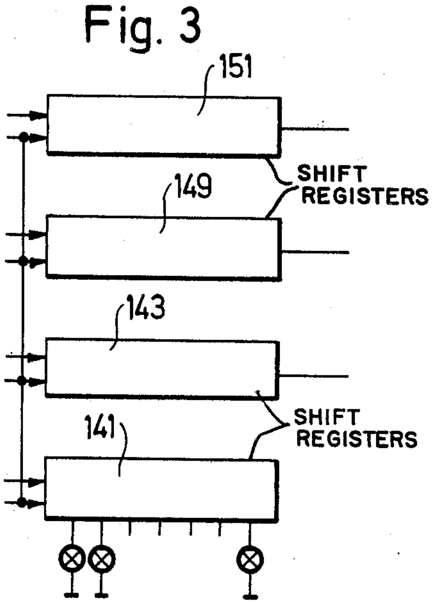
FIGS. 3 to 5 show schematically further advantageous developments of the embodiments of FIGS. 1 and 2.

FIG. 3 shows the use of two additional shift registers 149 and 151, the information inputs of which are again connected to the output of the RAM-store 125. An arrangement of this kind serves for the purpose of assigning each property, for example, each colour, to a special shift register. If, for instance, corresponding with the embodiment of FIG. 2, the first colour chosen is transmitted to the shift register 143, then points with other colours can also be scanned in subsequent scanning steps without the necessity for first transferring the items of information obtained already to the peripheral apparatus 103. In this case it is convenient to couple the clock inputs of the shift registers 143, 149 and 152 each, respectively, with one special key on the keyboard which, when operated, causes items of information to be found in the shift register 141 to be also written in the additional shift register assigned to such items.

Figure 4:
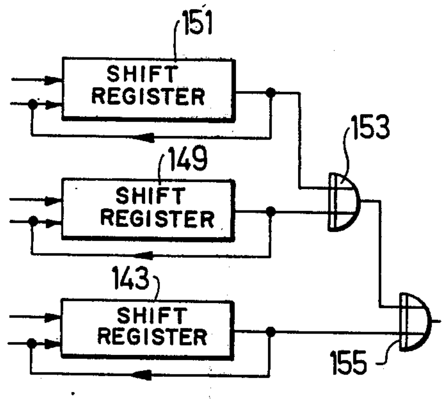

In application of the emobodiment of FIG. 3 it is possible after completing the scanning of a row to check the three shift registers 143, 149 and 151 easily, to determine whether any one point has had no property or more than one property assigned to it. For this purpose, the shift registers may, for instance, be designed as dynamic shift registers, with their information outputs connected to the information inputs. If, in addition, as is shown schematically in FIG. 4, the information outputs of the shift registers are connected to each other in pairs by means of exclusive OR-members 153 and 155, then with a complete revolution of all the items of information in the three shift registers there should be no alteration produced in the signal at the output of the OR-member 155.

Figure 5:
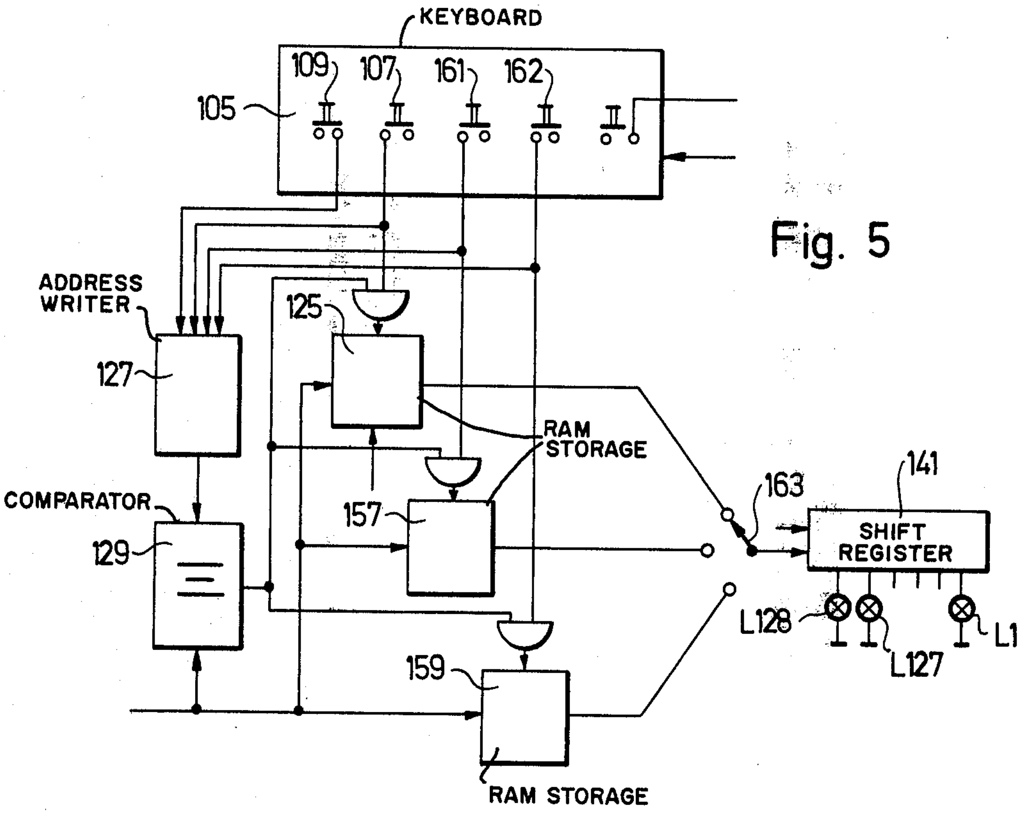

Finally, FIG. 5 shows an embodiment which permits the simultaneous input of all the properties and which achieves the advantage that all points on the line can be included in a single scanning step, which may be set against the disadvantage of higher cost. In place of the single RAM-store, three RAM-stores 125, 157 and 159 are provided in this case, by means of which it is possible to include a total of four properties. In contrast to FIG. 2 it is only necessary, in this case, to provide two additional keys 161 and 162, which are connected, through corresponding AND-members, to the RAM-stores 157 and 159. In addition, it is convenient to use the same shift register 141 for all three RAM-stores, in that it can be switched over to any desired RAM-store by means of a switch 163. If the switch 163 remains in the position as shown in FIG. 5, it is only possible to check those information items which were inserted by means of the key 107 continuously. However, after the scanning process has been completed it is possible to check whether the other properties have also been assigned correctly by switching over the switch 163.

The apparatus described can be modified in many ways. Thus, for instance, it would also be possible to employ in place of the RAM-store, as in FIG. 2, a dynamic shift register in which the information output is connected to the information input. In this case, instead of the recording processes taking place at the frequency of the frequency divider, recirculation takes place in the shift register and blinking of the lamps corresponding to the points to be scanned occurs with half the frequency of recirculation or with a lower frequency produced from the recirculation frequency by means of frequency division.

It is further possible to employ mechanical slides in place of the lamps which indicate the presence or the absence of a chosen property, such mechanical slides being controlled by electromagnets or by flexible vibrators in relation to the items of information stored in such a way that they are pushed forward or withdrawn, so that, for instance, the forward position corresponds with the presence and the withdrawn position to the absence of a chosen property. If, after the scanning process, the scanned line is covered by a row of slides of this type then, if the input of information is correct, no point with the chosen property should still be visible.

Figure 6:
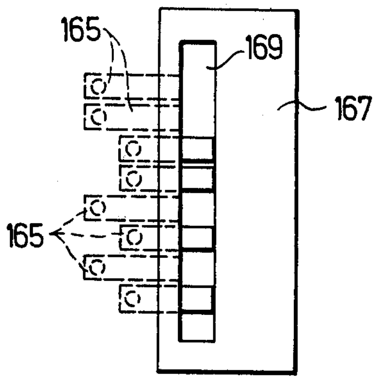
FIGS. 6 and 7 show an embodiment of the invention with mechanical slides as the checking elements.
Figure 7:
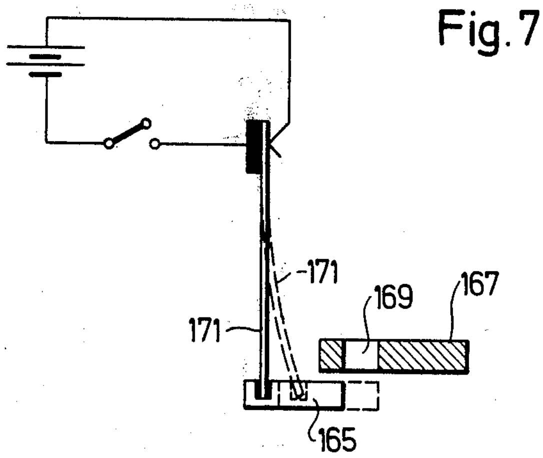

FIGS. 6 and 7 show schematically a device provided with slides 165. The slides 165 are mounted in bearings to be movable under a plate 167 which has a transverse slit 169, in such a way that they either leave the slit 169 completely free (full lines) or cover it (dashed lines). The slides 165 are steered by means of the flexible vibrators 171, which are stressed on one side and are bent (dashed lines) by applying a potential at their two electrodes. Bimetallic strips or piezo-electric flexible vibrators, for example, are suitable for this purpose. Application of the potential to the electrodes of the flexible vibrator 171 may take place in the same way as is described with reference to FIG. 1 for the lamps L, so that after a complete scanning of a line of the sample all those slides are pushed forwards over the transverse slit 169 which, for example, correspond to points which do not possess the chosen property.

In addition, it would also be possible to design the lamps described above in such a way that they could light up in different colours. This possibility would preferably be used in devices according to FIG. 5, in such a way as to cause the lamps L1 to L128 to light up, not only in the desired positions, but also in the desired colours.

Finally, the shift register 141 described in particular with reference to FIG. 2, could be replaced by any known series/parallel converter in which the items of information can be put in in series and taken out in parallel.

We claim:

1. Equipment for line-by-line scanning of a drawing and for feeding the data obtained by scanning to a programming memory, the drawing consisting of lines and columns of dots, each having at least one of several different properties, comprising in combination means for providing electrical signals corresponding to a selected property of said dots, an intermediate memory for temporary storage of at least as many signals as are obtained by scanning all of the dots in one line having the same selected property, a plurality of visual checking elements mounted immediately adjacent the dots of a line and equal in number at least to the number of dots in one line and having the same spatial configuration as the dots of the line so that each visual checking element is associated with its own dot, a programming memory, input means connected with said programming memory for supplying the signals stored in said intermediate memory to said programming memory, and test means connected to the checking elements to apply to the checking elements, a visual signal for verification of the electrical signals obtained by scanning the dots associated with said checking elements stored in said intermediate memory prior to being supplied to said programming memory.

2. A device according to claim 1, wherein the checking elements can take up and maintain at least two states, one of which indicates the presence and the other the absence of a chosen property.

3. Equipment as claimed in claim 2 and further comprising means for periodically changing the state of the checking elements associated with the dot which will be next scanned.

4. A device according to claim 2, wherein the checking elements consist of lamps which can be switched on and off.

5. A device according to claim 4, wherein each lamp can be lit up in one of several colours.

6. A device according to claim 2, wherein the control elements consist of elements which can be altered in position in accordance with the properties of the points to be scanned.

7. A device according to claim 1, wherein the checking elements allow a simultaneous check of all the points in a line after the scanning of a line.

8. A device according to claim 1, wherein the test means consists of JK-flipflops which are assembled in the form of a matrix and are connected to the checking elements.

9. A device according to claim 1, wherein the intermediate memory includes a RAM-store.

10. A device according to claim 9, wherein the RAM-store is replaced by a dynamic shift register, the information output of which is connected to its information input, so that its storage contents can be periodically recirculated.

11. Equipment as claimed in claim 1 wherein the means for providing electrical signals includes an automatic scanning system for scanning the drawing.

12. Equipment as claimed in claim 1 wherein the means for providing electrical signals includes a keyboard having at least as many different keys as there are different properties of the dots.

13. Equipment as claimed in claim 12 wherein said intermediate memory comprises a plurality of intermediate memories each for temporary storage of signals corresponding to different properties of the dots.

14. Equipment as claimed in claim 1 wherein said test means comprises at least one series-parallel converter connected to said intermediate memory and provided with outlets for activating said visual checking elements.

15. Equipment as claimed in claim 14 wherein said at least one series-parallel converter is a shift register.

16. Equipment as claimed in claim 14, wherein said test means comprises a plurality of interconnected series-parallel converters, the signals corresponding to the different properties of the dots, after verification by said checking elements, being stored in said converters.

17. Equipment as claimed in claim 16 wherein the plurality of series-parallel converters are shift registers.

18. A device according to claim 16, including means for checking for missing and/or duplicated properties.

19. Equipment as claimed in claim 1 and further comprising means for displaying that checking element which is associated with the dot which will be next scanned.

* * * * *